United States Patent
Arcuri et al.

(12) 
(10) Patent No.: US 6,278,450 B1
(45) Date of Patent: *Aug. 21, 2001

(54) SYSTEM AND METHOD FOR CUSTOMIZING CONTROLS ON A TOOLBAR

(75) Inventors: Michael P. Arcuri, Seattle; Christopher Michael McBride, Kenmore; Martijn E. van Tilburg, Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/544,966

(22) Filed: Apr. 7, 2000

Related U.S. Application Data

(63) Continuation of application No. 09/098,770, filed on Jun. 17, 1998, now Pat. No. 6,133,915.

(51) Int. Cl.[7] .................................................. G06F 3/14
(52) U.S. Cl. .............................................. 345/334; 345/339
(58) Field of Search ................................... 345/326, 333, 345/334, 339, 347, 348, 349, 352, 354

(56) References Cited

U.S. PATENT DOCUMENTS

| | | | |
|---|---|---|---|
| 4,680,729 | 7/1987 | Steinhart | 345/173 |
| 4,692,858 | 9/1987 | Redford | 345/333 |
| 5,041,967 | 8/1991 | Ephrath | 345/352 |
| 5,115,501 | 5/1992 | Kerr | 707/9 |
| 5,220,675 | 6/1993 | Padawer | 345/333 |
| 5,261,042 | 11/1993 | Brandt | 345/333 |
| 5,287,514 | 2/1994 | Gram | 345/333 |
| 5,465,358 | 11/1995 | Blades | 345/339 |
| 5,644,737 * | 7/1997 | Tuniman et al. | 345/352 |
| 5,644,739 * | 7/1997 | Moursund | 345/354 |
| 5,726,688 | 3/1998 | Siefert et al. | 345/352 |
| 5,757,371 * | 5/1998 | Oran et al. | 345/348 |
| 5,760,768 | 6/1998 | Gram | 345/333 |
| 5,828,376 * | 10/1998 | Solimene et al. | 345/352 |
| 5,892,512 * | 4/1999 | Donnelly et al. | 345/349 |
| 5,897,670 | 4/1999 | Nielsen | 345/334 |
| 5,914,714 * | 6/1999 | Brown | 345/339 |
| 6,057,836 * | 5/2000 | Kavalam et al. | 345/334 |
| 6,121,968 * | 9/2000 | Arcuri et al. | 345/352 |
| 6,133,915 * | 10/2000 | Arcuri et al. | 345/334 |

OTHER PUBLICATIONS

Intelligent Tool Tracker/Display IBM Technical Disclosure Bulletin vol. 37 No. 2A, Feb. 1, 1999, p. 175.
Steve Harris et al. "Inside WordPerfect 6 for Windows: New Riders Publishing", P. 1063, 1994.
"Suitable Icon" IBM Technical Disclosure Bulletin, vol. 39 No. 11, p. 63–64, 1996.
"Microsoft Works Reference" Appendix E: Macros, Copyright Microsoft Corporation 1987, 1988, 1989 p. 369–382.
"Microsoft Word User's Guide" Version 5.0 copyright 1991–1992 Microsoft Corporation, p. 61–66.

* cited by examiner

Primary Examiner—Crescelle N. dela Torre
(74) Attorney, Agent, or Firm—Kilpatrick Stockton LLP

(57) ABSTRACT

Customizing a presentation of a set of control elements, such as toolbar, by using a graphical user interface element representing the toolbar control elements, such as a quick customize (QC) menu. This customization approach allows a user to access the QC menu to select which control elements are to be displayed on the toolbar. The controls presented by the QC menu are typically associated with the control items of a particular toolbar or a corresponding set of commands. For convenient user access, the QC menu can be exposed on the toolbar via a special control or an entry point and typically lists the control elements available for the toolbar in order of appearance on the toolbar. For example, the QC menu can present the toolbar's default commands or controls, controls that are "top" or frequently used candidates for the toolbar, and any controls currently on the toolbar. Each control presented by the QC menu has a corresponding selection indicator, such as a checkbox, for easily adding to or removing a control element from the associated toolbar.

17 Claims, 10 Drawing Sheets

SYSTEM AND METHOD FOR CUSTOMIZING CONTROLS ON A TOOLBAR

This is a continuation of application Ser. No. 09/098,770, filed on Jun. 17, 1998, now U.S. Pat. No. 6,133,915.

TECHNICAL FIELD

The present invention relates to a system and method for customizing the presentation of control elements on a toolbar, and is more particularly directed to adding control elements to and removing control elements from a toolbar by using a graphical user interface (GUI) element presenting information related to the toolbar control elements.

BACKGROUND OF THE INVENTION

Most modern computer software employs a GUI-type visual presentation to convey information to and receive commands from users. This interface relies on a variety of GUI elements or objects, including icons, text, drop-down menus, dialog boxes, toolbars, buttons, controls, and the like. A user typically interacts with a GUI presentation by using a pointing device (e.g., a mouse) to position a pointer or a cursor over an object and "clicking" on the object. Examples of operating systems that provide a graphical user interface are the "WINDOWS 95" and "WINDOWS 98" operating systems, which are manufactured and distributed by Microsoft Corporation of Redmond, Wash.

In a GUI system, toolbars are common user interface elements that provide an effective way to display numerous computer commands or control elements. Toolbars are GUI elements associated with an application window, which is a window for a particular application program in which primary viewing and/or editing interaction occurs. Toolbars provide access to a set of commands that are usually represented by buttons, menu buttons, comboboxes, and other UI controls. A user can invoke any command in the toolbar by clicking on the associated button or UI control. Toolbars typically present groups of controls in rows or columns, which can be oriented horizontally or vertically. Although most toolbars are visually attached to an application window, some may float above, below, or to the side of an application window. The control elements or commands presented on a toolbar are quickly accessible by the user because these items are only one click away while the user is using the associated program.

In some programs that employ toolbars, the toolbars can be modified by adding or deleting controls, or by changing the function associated with a control. This allows the user to customize a toolbar so that the toolbar provides convenient access to the commands that are most frequently used by the user. In addition, these programs support multiple toolbars that can be turned on and off, thereby providing the user with the option of viewing two or more toolbars simultaneously. In some prior art systems, the process of customizing or manipulating toolbars requires use of a dialog box that displays a list of commands available for the toolbar. The dialog box also can display a list of available toolbars that can be displayed in the application window. The user can then customize the toolbar by selecting which controls the user wants displayed.

Unfortunately, in these prior dialog box-type systems, customizing toolbars can be difficult because discovering this type customization feature is difficult for the typical user and, once discovered, use of the dialog box for a customization task is not an intuitive operation. For example, performing a seemingly simple task such as "remove button A from toolbar X" may require the user to not only find the dialog box for customizing the toolbar, but also decipher how to modify the specific toolbar, and decipher how to delete button A. In addition, some prior systems support a drag and drop mouse operation where controls are dragged and dropped on or outside of the toolbar to add and remove controls, respectively. However, the user may be reluctant to experiment with customizing the toolbar using these prior systems for fear that the user will be unable to restore the toolbar to its previous state or original form.

Furthermore, some prior systems provide centralized access to multiple toolbars, thereby making customization of a specific toolbar less certain or precise. Specifically, in an attempt to customize a specific toolbar, the user can accidentally alter another toolbar. Moreover, in these prior systems, removing or deleting a control from a toolbar also may remove the control from the dialog box. Hence, a less sophisticated user may be unable to find the location of the control if ever needed in the future and may be unable to restore the toolbar to its original or default state. As a result, the user may be reluctant to utilize the toolbar customization features.

Therefore, there is a general need for a method for easily and conveniently customizing the presentation of a set of control elements or commands, such as a toolbar, in a GUI-type interface for a program module. In addition, there is a need for a method that allows direct access to each toolbar so that customization is easily available and focused on the active toolbar. Also, there is a need for a single mechanism for maintaining and presenting information related to a likely set of controls that are available for a specific toolbar. There is a further need for a method that allows control elements to be removed from the toolbar without deleting or "hiding" the control elements from future access by the user. There is also a need for a method that facilitates multiple changes to the set of control elements presented by a toolbar during a single exercise a GUI element containing selection indicators having an operational state that determines whether corresponding control elements are presented on the toolbar.

SUMMARY OF THE INVENTION

The present invention satisfies the above-described needs by providing a system and method for customizing the presentation of a set of control elements or commands, such as a toolbar, in a graphical user interface (GUI) of a program module. In general, the present invention provides a "discoverable" customization mechanism that allows a user to select which control elements should be displayed on a toolbar by accessing a GUI element presenting information and controls related to the presentation of these control elements. More particularly described, the present invention provide a user intuitive mechanism for accessing a drop-down menu, referred to herein as a quick customize menu ("QC menu"), for presenting selection indicators corresponding to available control elements of a toolbar. In response to accessing the QC menu and selecting a particular selection indicator, the presentation of a corresponding control element can be easily controlled by the user. For example, by enabling a selection indicator, the corresponding control element is presented for operation on the toolbar, whereas disabling this selection indicator results in no presentation of the corresponding control element on the toolbar.

For one aspect of the present invention, the presentation of a toolbar having a set of control elements within a GUI environment of a program module can be customized by controlling the state of selection indicators associated with the control elements and presented in a GUI element, such as a drop-down menu. The GUI element is displayed on a display device in response to receiving an access signal typically generated by accessing a special control or an entry point on the toolbar or by "clicking" a particular mouse button while the cursor is positioned over the toolbar. The GUI element can present information associated with the control elements of the toolbar, and typically provides selection indicators for determining whether corresponding control elements will be presented for operation on the toolbar. If a selection indicator enters a first state, then the corresponding control element is displayed on the toolbar and is available for operation by the user of the program module. In contrast, if the selection indicator enters a second state, the corresponding control element is not displayed on the toolbar and is unavailable for operation by the user. In this manner, a user can create a custom display of the control elements presented for operation on a toolbar by accessing the GUI element and manipulating the state of corresponding selection indicators presented by the GUI element.

For example, the GUI elements can be implemented as a quick customize menu ("QC menu"), typically a drop-down menu, for presenting information associated with and specific to a particular set of control elements or commands for operating features of the program module. The QC menu is readily discoverable by a user because this GUI element is typically exposed on the toolbar via a special control or an entry point, such as a button or a menu, or by "clicking" a particular mouse button while the cursor is positioned over the toolbar. The QC menu typically presents information related to the default commands or control elements for the toolbar, control elements that represent the most frequently used or "top" command candidates for the toolbar, and controls currently displayed on the toolbar. In particular, each control element for a toolbar has a corresponding selection indicator in the QC menu. The state of a selection indicator can be manipulated by a user for easily adding a control element to or removing a control element from the associated toolbar. In this manner, the QC menu provides a simple and straightforward mechanism for customizing the presentation of a set of control elements or commands, such as a toolbar.

For yet another aspect of the present invention, the QC menu contains a set of selection indicators represented by GUI control items, such as checkboxes, each capable of containing a checkmark, for each control element of the toolbar. The checkbox can enter the first state by placing a checkmark the checkbox, thereby resulting in the presentation of the corresponding control element on the tool bar. Alternatively, the checkbox can enter the second state by removing the checkmark, thereby preventing the corresponding control element from presentation on the toolbar. Consequently, as a result of selecting a checkbox in the QC menu, the presentation of control elements available for operation on the toolbar can be easily updated by a user. Alternatively, the selection indicators can be implemented by other modal control items, including radio buttons. Advantageously, the QC menu can remain open during customization operations, and need not be closed until an indication is given to do so—for example, a user may click outside the QC menu, a command may be selected, or some other function may be performed.

In view of the foregoing, it will be appreciated that the present invention provides direct access to a toolbar for easy and convenient customization of the toolbar. The present invention also provides the benefit of allowing a user to remove controls from a toolbar without losing subsequent access to these controls based on manipulation of selection indicators in a GUI element associated with these controls. The present invention also facilitates multiple changes to the presentation of controls on a toolbar during a single exercise by accessing a GUI element, such as the QC menu, and controlling the state of the selection indicators corresponding to the controls.

These and other features and advantages of the present invention may be more clearly understood and appreciated from a review of the following detailed description of the disclosed exemplary embodiments and by reference to the appended drawings and claims.

DETAILED DESCRIPTION OF THE EXEMPLARY EMBODIMENTS

The present invention provides a system and method for customizing the presentation of control elements on a toolbar by utilizing GUI element, such as a drop-down menu, having selection indicators that determine whether the corresponding control elements should be displayed for operation on the toolbar. The present invention may employ an object-oriented programming framework that supports consistent and reusable components. In an exemplary embodiment, the invention is incorporated into the "MICROSOFT OFFICE 9" application program, which is produced and distributed by Microsoft Corporation of Redmond, Wash. Those skilled in the art will appreciate that the "MICROSOFT OFFICE 9" application program runs on Microsoft Corporation's "WINDOWS 95", "WINDOWS 98" or "WINDOWS NT 4.0 and 5.0" operating systems and utilizes several features that are associated with these operating systems. These operating systems also support Microsoft Corporation's object linking and embedding (OLE) interface. Information about the operating systems, OLE, and other operating system components are available in associated documentation published by Microsoft Press and other publishers of computer-related information.

In the "MICROSOFT OFFICE 9" suite of application programs an architectural component known as a quick customize menu ("QC menu") provides sets of tool-type UI components or controls, referred herein as selection indicators, for customizing an associated toolbar. The QC menu typically is exposed for operation by the user via a special control or an entry point, such as a button or menu, on the toolbar or by "clicking" a selected mouse button while the cursor is located over the toolbar. The QC menu typically presents information related to the default commands or control elements for the toolbar, control elements that represent the most frequently used or "top" command candidates for the toolbar, and controls currently displayed on the toolbar. In particular, each control element for a toolbar has a corresponding selection indicator in the QC menu. The state of a selection indicator can be manipulated by a user for easily adding a control element to or removing a control element from the associated toolbar. In this manner, the QC menu provides a simple and straightforward mechanism for customizing the presentation of a set of control elements or commands on a toolbar.

Figure 1:
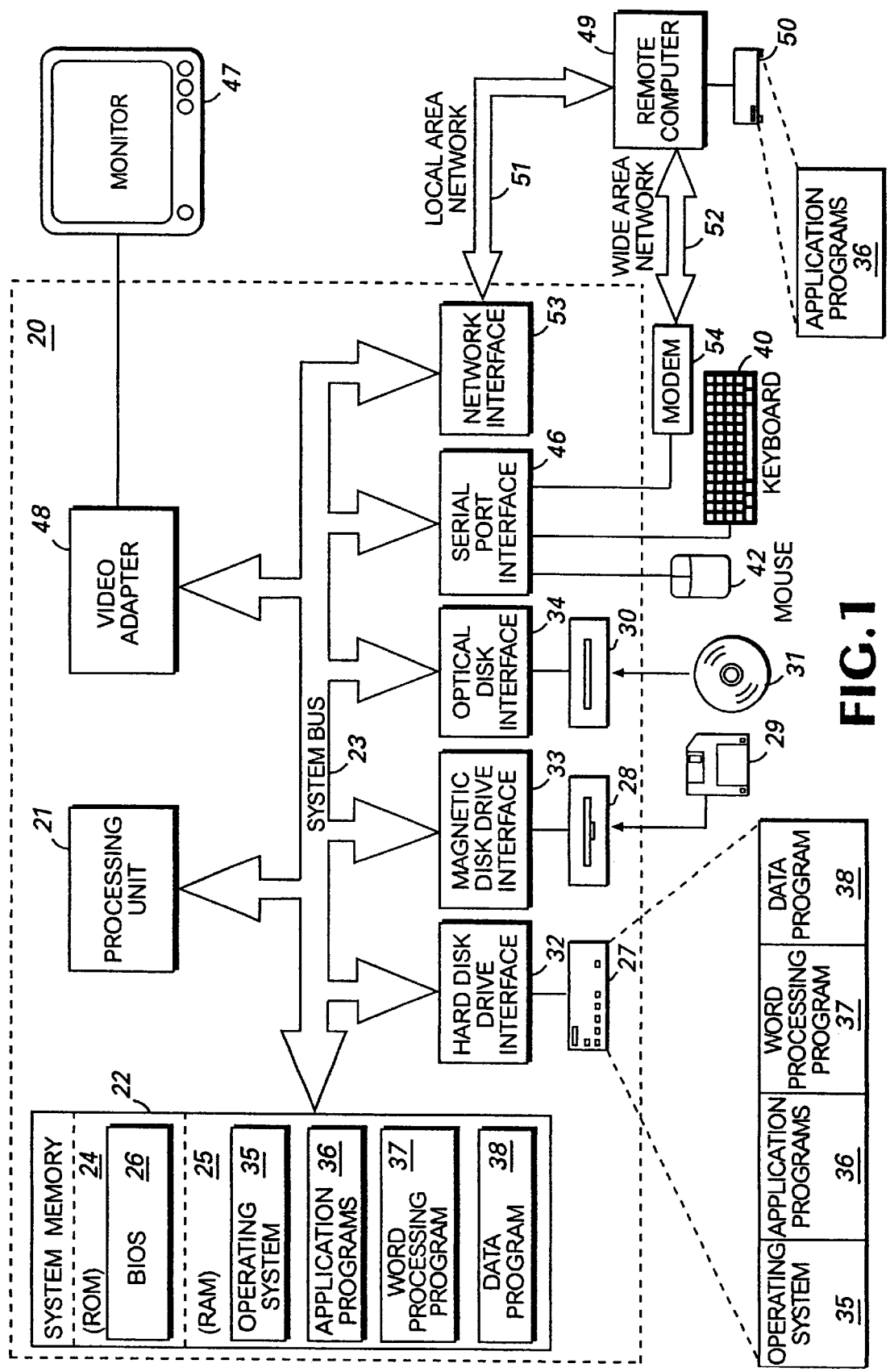
FIG. 1 is a block diagram of a computer system representing the operating environment for an exemplary embodiment of the present invention.

Referring now to the drawings, in which like numerals represent like elements throughout the several figures, aspects of the present invention and an exemplary operating environment will be described. FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented as another type of program module or in combination with other program modules. Generally, program modules include routines, operating systems, application programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, which may include an operating system shell, one or more application programs 36, such as the "MICROSOFT OFFICE 9" suite of application programs, a word processing program module 37, such as "MICROSOFT WORD" program module, which is a part of the "MICROSOFT OFFICE 9", and program data 38. A user may enter commands and information into the personal computer 20 through a keyboard 40 and pointing device, such as a mouse 42. Other input devices (not shown) may include a pen, touch-operated device, microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, application programs depicted relative to the personal computer 20, or portions thereof, may be stored in the remote memory storage device. It will be appreciated that the network connections shown are exemplary and other means of establishing a communications link between the computers may be used.

With continuing reference to FIG. 1 and now turning to FIGS. 2a, 2b, 2c, 2d and 2e, the user's environment for an exemplary embodiment of the present invention will be described by utilizing screen displays generated by the exemplary program module 37. FIGS. 2a–2e, collectively described as FIG. 2, illustrate partial screen displays that depict a process by which a user can conveniently customize a toolbar using an associated drop-down menu, known as a quick customize menu. For purposes of this discussion, a quick customize menu is referred to herein as simply a "QC menu". Those skilled in art will appreciate that the QC menu is implemented in the form of a drop-down menu, which is a conventional GUI element, and that the present invention can be readily adapted to include other forms of GUI elements as a substitute for the QC menu, including a dialog box, a toolbar and the like.

Figure 2A:
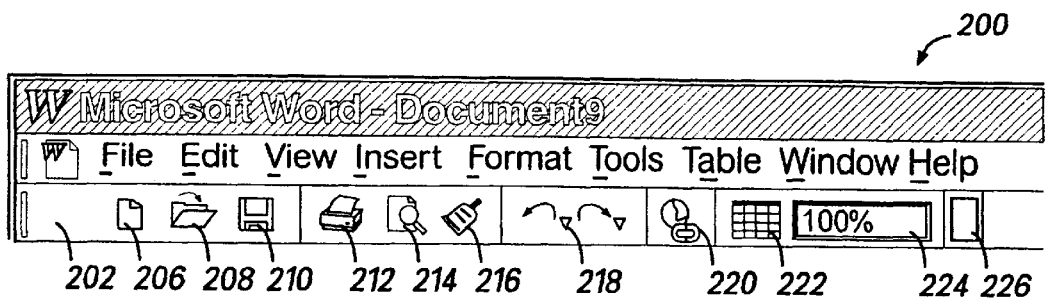
FIGS. 2a, 2b, 2c, 2d, and 2e, collectively described as FIG. 2, depict screen displays illustrating a toolbar and a quick customize menu displayed by an operating system in accordance with an embodiment of the present invention.

In FIG. 2a, display screen 200 displays a representative toolbar 202 associated with the "MICROSOFT WORD" program module 37 (FIG. 1), which is a word processing program module that is a part of the "MICROSOFT OFFICE 9" application program suite 36 (FIG. 1). It will be appreciated by one skilled in the art that the present invention is not limited to the toolbar described herein, but encompasses any type of toolbar containing control elements or commands for controlling the features of a program module. The toolbar 202 includes controls 206–224 that are associated with the program module 37. Specifically, the toolbar 202 includes the following controls: New 206, Open 208, Save 210, Print 212, Preview 214, Format Painter 216, Undo 218, Insert Hyperlink 220, Insert Table 222, and Zoom 224. These controls 206–224 perform specific functions in association with the program module 37. For example, the New control 206 allows a user to create a new document when selected, and the Print control 212 allows the user to print the document to a printer (not shown) when it is selected. The toolbar 202 also includes an entry point 226 for accessing additional options in connection with the toolbar 202.

Specifically, the entry point 226, which is located on the right edge of the toolbar 202, provides access to a feature for customizing the toolbar 202. For example, a drop-down menu, such as a QC menu 240 (FIG. 2b) typically is exposed for operation by the user via the entry point 226. The entry point can be implemented by a conventional toolbar button or menu, or by a special control element. Although this exemplary embodiment includes a visible entry point, those skilled in the art will appreciate that the function of an entry point to the customization feature can also be implemented by "clicking" a selected mouse button while the cursor is located over a particular location of the toolbar. In response to accessing the QC menu via an entry point, such as the entry point 226, the user can customize the toolbar 202 by adding controls to and removing controls from the toolbar 202. The exemplary embodiment illustrated in FIG. 2 provides a simplified way of performing these toolbar customization tasks by utilizing the QC menu 240 in connection with the toolbar 202, as shown in more detail below with reference to FIG. 2b.

Figure 2B:
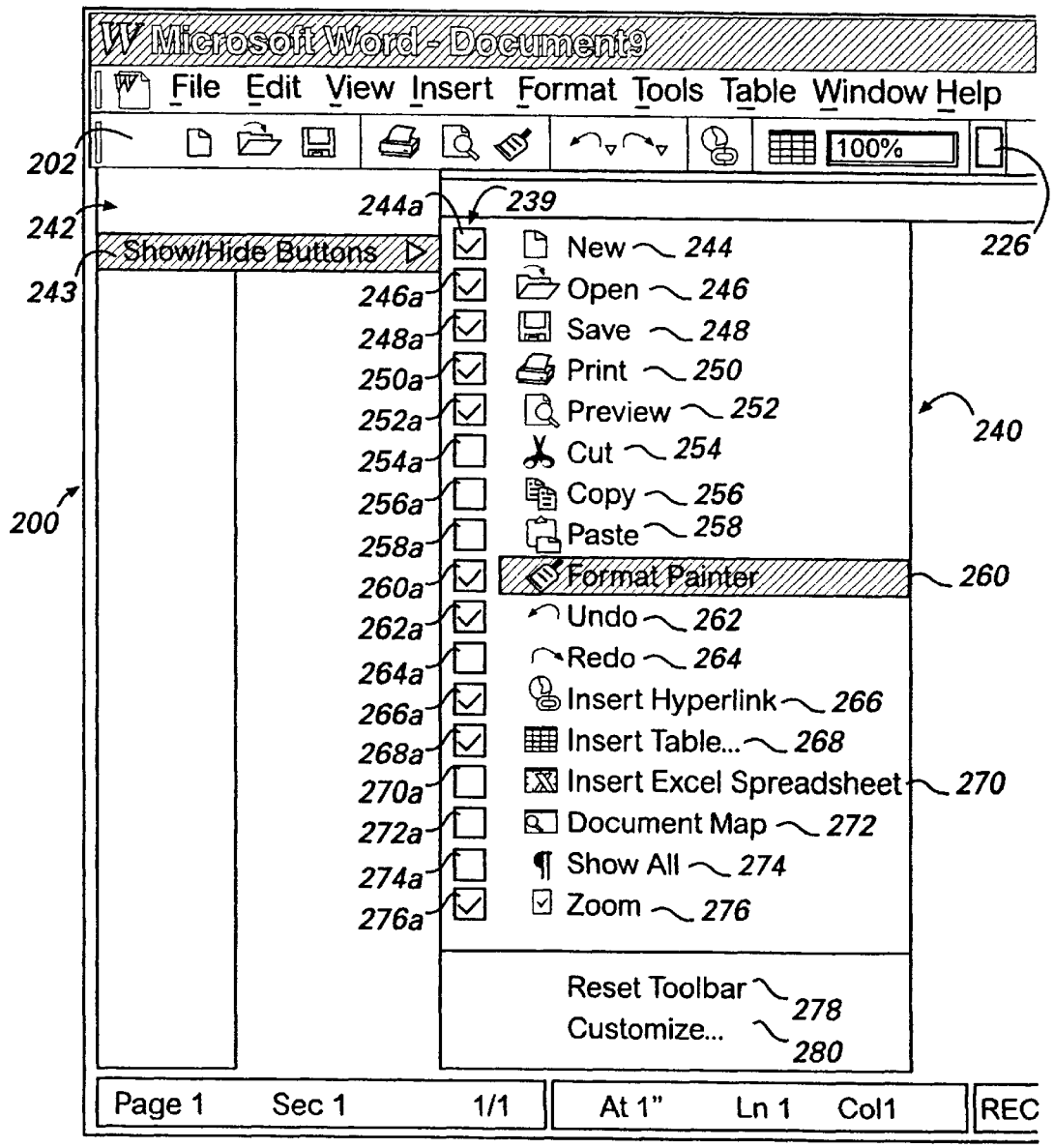

Referring still to FIG. 2a, to gain access to the customization feature, the user can use the mouse 42 (or keyboard 40) to move a cursor to the entry point 226, and thereafter click on (or select) the entry point 226. When the user clicks on the entry point 226, a drop-down menu 242 is displayed on the display screen 200, as shown in FIG. 2b. The drop-down menu 242 contains an option, Show/Hide Buttons 243, which provides access to selection indicators or "buttons" corresponding to control elements on the toolbar 202. By selecting the option 243, the QC menu 240 (FIG. 2b) appears on the display screen 200.

Referring now to FIG. 2b, the QC menu 240 includes buttons 244–276 which represent controls that are available for display on the toolbar 202. These buttons, also known as selection indicators, represent controls that are determined by software developers of the program module 37 before shipping the program module. These buttons 244–276 include the following: New 244, Open 246, Save 248, Print 250, Preview 252, Cut 254, Copy 256, Paste 258, Format Painter 260, Undo 262, Redo 264, Insert Hyperlink 266, Insert Table 268, Insert Excel Spreadsheet 270, Document Map 272, Show All 274, and Zoom 276. Each button on the QC menu 240 has an associated checkbox 244a–276a for containing checkmarks. The QC menu 240 also includes a Reset Toolbar option 278 and a Customize option 280. The Reset Toolbar option 278 returns the toolbar to its original or default state, which preferably is determined before shipping the program module 37. Moreover, the Customize option 280 provides a full customization feature for the toolbar.

As used with respect to the QC menu 240, the term "button" is defined as a control in the QC menu for controlling the selection of a corresponding control element for presentation on a toolbar. A button, also described herein as a selection indicator, has a pair of operating states: the first state enables the presentation of the corresponding control element on the toolbar, whereas the second disables the presentation of the corresponding control element on the toolbar. This control function of the selection indicators in the QC menu 240 is distinguishable from their corresponding control elements on the toolbar 202. For this exemplary embodiment, a selection indicator can be represented within the QC menu 240 as an icon and associated text, which identifies a control element that may be displayed on the toolbar, and an associated checkbox for indicating whether the control will be displayed on the toolbar. Those skilled in the art will appreciate that the selection indicator can be visually displayed within this drop-down menu as other forms of conventional GUI elements, including the combination of an icon and a checkbox, descriptive text and a checkbox, an icon and a radio button, etc.

This exemplary embodiment uses a drop-down menu having selection indicators, preferably implemented as a checkbox, to indicate whether corresponding controls for a toolbar should be presented on the toolbar for available operation by a user. A checkbox is a type of interactive control often found in a GUI and is used to enable or disable one or more features or options from a set of features or options. For example, when a selection indicator in the menu is selected, a checkmark appears in the checkbox for the button, thereby indicating that a corresponding control is displayed on the toolbar. Furthermore, when a checkbox containing a checkmark is selected, the checkmark disappears, and a corresponding control is removed from the toolbar. In other words, the selection indicator, in this embodiment shown as a checkbox, can operate as a control having a first state and a second state. The first state is indicative of the checkbox containing a checkmark, and the second state is indicative of the checkbox being empty. The process of selecting a checkbox causes the state to change from the first state to the second state, and alternatively from the second state to the first state.

It will be appreciated by one skilled in the art that the controls of the toolbar and the selection indicators of the QC menu are presented as a representative example and in no way serve as a limitation to the number or combination of controls and selection indicators that may be used to implement alternative embodiments of the present invention. Further, it will be appreciated that the present invention is not limited to the use of a checkbox for indicating the presentation of a corresponding control element on a toolbar. Alternative embodiments may use other mechanisms suitable for indicating selection of a control—for example, giving focus to or highlighting a selected button, changing the color of a selected button, displaying a different icon, such as a light bulb, for a selected button, or using radio buttons.

Continuing to refer to FIG. 2b, the buttons 244–276 in the QC menu 240 are preferably presented in the same order as their corresponding controls are to be displayed on the toolbar 202. Specifically, the QC menu 240 presents buttons in a top-down fashion, and the toolbar 202 presents controls in a left-right fashion, where the top button 244 of the QC menu 240 corresponds to the leftmost control 206 in the toolbar 202 and the bottom button 276 of the QC menu 240 corresponds to the rightmost control 224 in the toolbar 202 assuming all controls are visible on the toolbar 202. A control corresponding to a button is displayed on the toolbar 202 for each button having a checkmark, such as checkmark 239, in its checkbox. Specifically, buttons 244, 246, 248, 250, 252, 260, 262, 266, 268, and 276 contain checkmarks in their respective checkboxes 244a, 246a, 248a, 250a, 252a, 260a, 262a, 266a, 268a, and 276a. As a result, each associated control is displayed on the toolbar 202. Buttons 254, 256, 258, 264, 270, 272, and 274 do not contain checkmarks in their respective checkboxes 254a, 256a, 258a, 264a, 270a, 272a, and 274a. Therefore, the associated controls are not displayed in the toolbar 202.

Figure 2C:
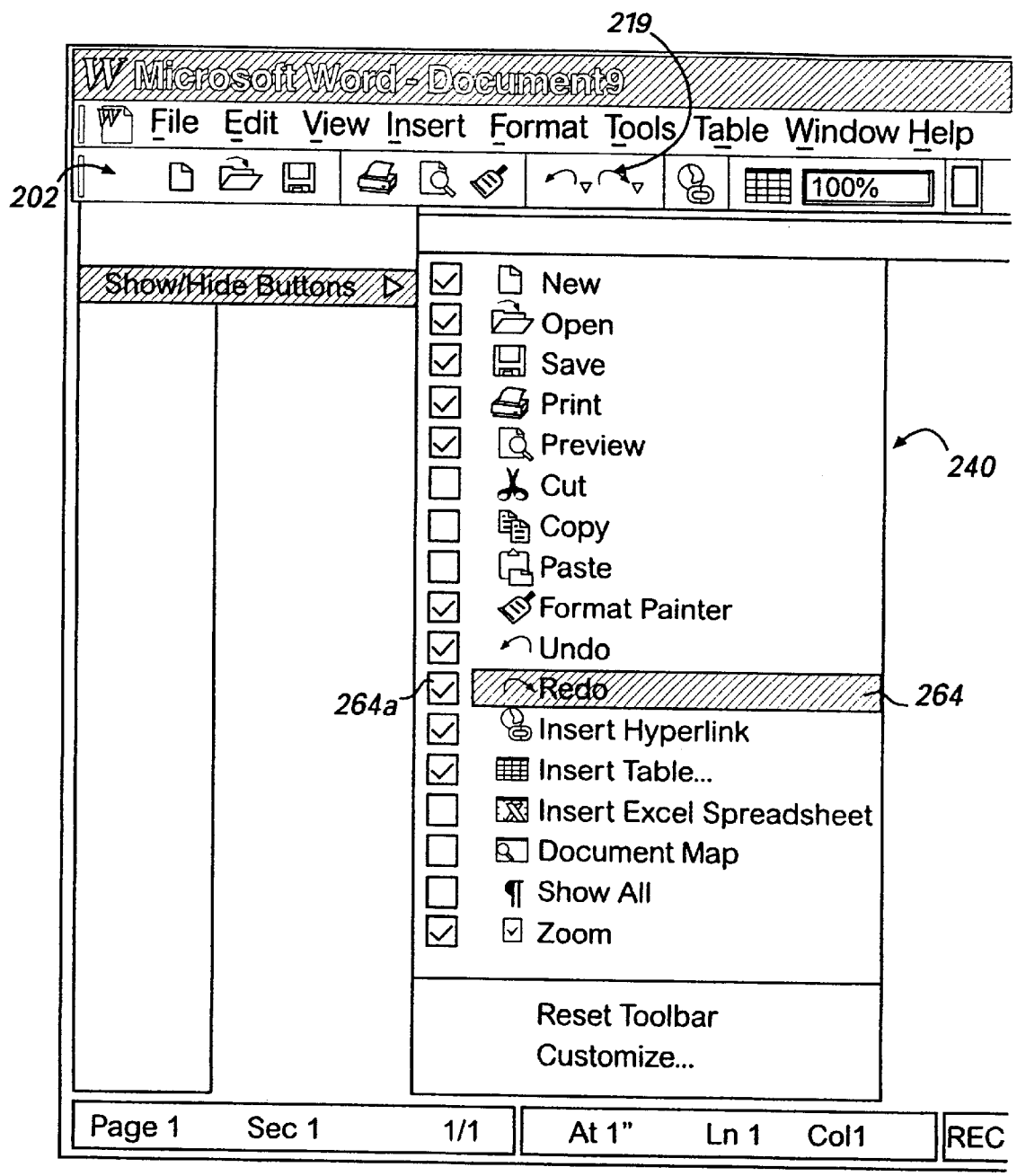

Referring to FIG. 2c, if a user desires to add a control to the toolbar, the user simply moves the cursor to an empty checkbox for a desired button in the QC menu 240 and clicks on the checkbox using the mouse 42. Once the user clicks on the empty checkbox, a checkmark is placed in the checkbox and the control for the button appears on the toolbar 202. For purposes of this discussion, the term "checking" is indicative of the checkbox entering the first state, as previously described—that is, a checkmark is placed in a checkbox for a button, thereby also indicating that a corresponding control is displayed on the toolbar associated with the QC menu. In addition, the term "unchecking" is indicative of the checkbox entering the second state, as previously described—that is, a checkmark is removed from a checkbox for a button, thereby also indicating that a corresponding control is not displayed on the toolbar associated with the QC menu. Furthermore, an empty checkbox for a button or unchecked button is indicative of a checkbox without a checkmark, while a checked checkbox for a button or checked button is indicative of a checkbox having a checkmark.

In FIG. 2c, as an example of adding a control to the toolbar 202, the user desires to add a Redo control 219 to the toolbar 202. To do so, the user simply clicks on the checkbox 264a. As a result, a checkmark is placed in the checkbox 264a for the Redo button 264 in the QC menu. Moreover, the Redo control 219, which is associated with the Redo button 264, is displayed on the toolbar 202. The user can continue this process of adding controls to the toolbar 202 by clicking on or selecting empty checkboxes for buttons in the QC menu 240. Advantageously, the QC menu 240 remains open until an indication is received based on an action by the user to close the QC menu 240.

Figure 2D:
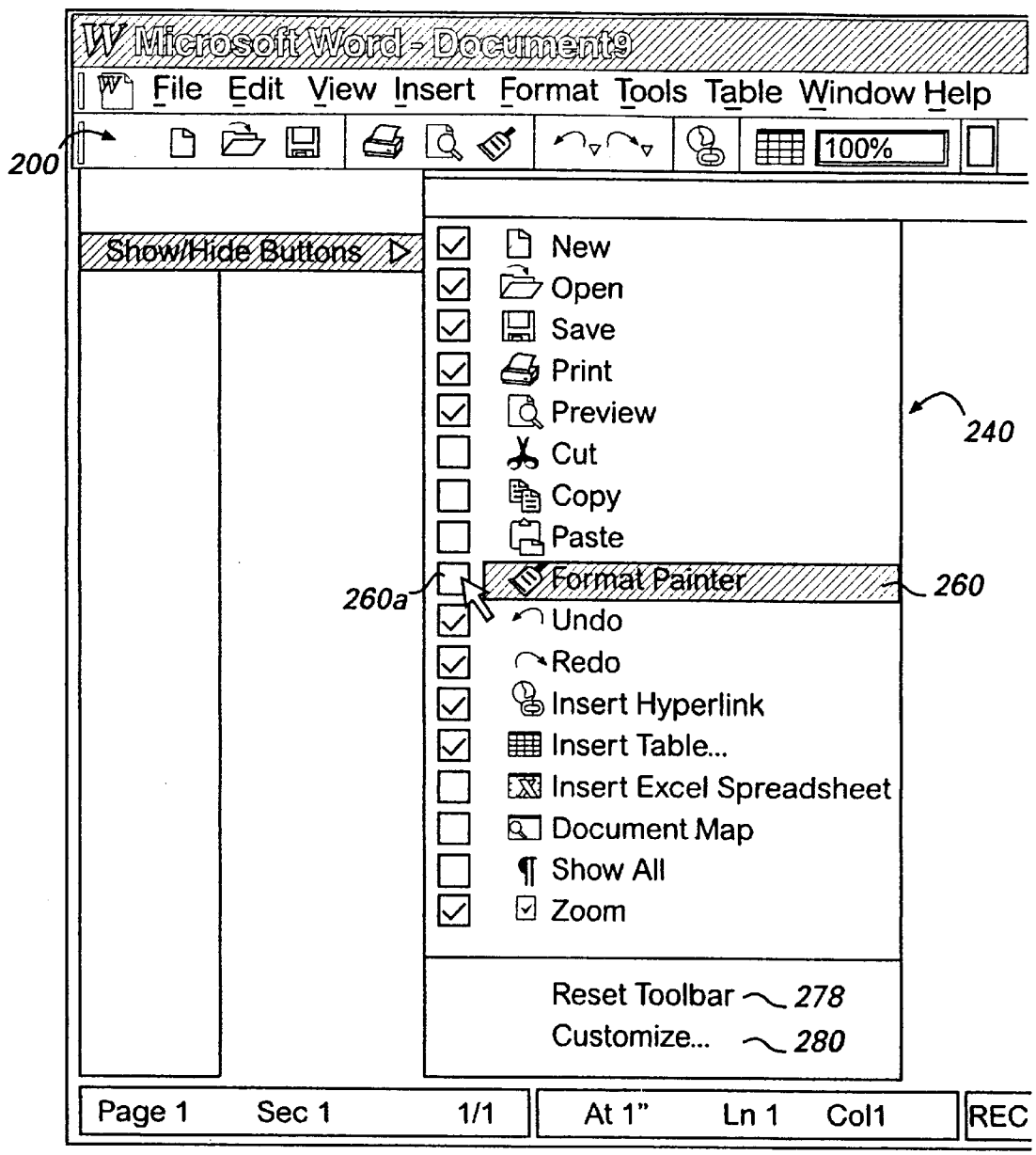

Turning to FIG. 2d, if a user desires to remove a control from a toolbar 202, the user simply clicks on or selects a checked checkbox for a button. By doing so, the checkmark in the checkbox for the button is removed. As a result of unchecking the checkbox for the button, the control corresponding to the button is instantly removed from the toolbar 202.

For example, the user desires to remove the Format Painter control 216 (FIG. 2a) from the toolbar 202. To do so, in FIG. 2d, the user simply clicks on the Format Painter checkbox 260a for the Format Painter button 260, thereby unchecking the format painter button in the QC menu 240. As a result, the Format Painter control 216 (FIG. 2a) associated with button 260 is removed from the toolbar 202. The user may continue the process of removing controls from the toolbar by simply clicking on checked checkboxes for buttons on the QC menu to remove the checkmarks from the checkboxes for the buttons. It will be understood that the user also can check (and uncheck) buttons via the keyboard. As previously stated, this exemplary embodiment provides the benefit of allowing the QC menu 240 to remain open during customization operations until an indication is received based on an action by the user to close the QC menu 240.

Figure 2E:
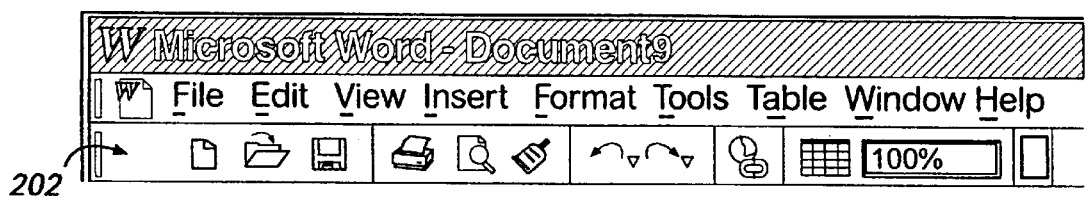

Once the user has finished customizing the toolbar 202, the user may then dismiss the QC menu 240 by simply clicking outside of the QC menu 240, by selecting the Reset Toolbar option 278 or the Customize option 280, by hitting escape (Esc) (not shown) on the keyboard 40 (FIG. 1), or by using some other suitable means of navigating off of the QC menu 240. Once the user dismisses the QC menu 240, the toolbar 202 continues to reflect the changes that were made to it when the QC menu was open, as shown in FIG. 2e.

In view of the foregoing, it will be appreciated that the present invention supports convenient customization of a toolbar by allowing a user to access a drop-down menu and to manipulate the menu's selection indicators corresponding to toolbar controls to determine the presentation of controls on the toolbar. Advantageously, the present invention allows a user to add controls to and remove controls from a toolbar as the user desires without facing the concern of whether the toolbar can be restored to its original or default state. Specifically, the present invention can provide the benefit of restoring deleted default controls without having to reset the toolbar, thereby losing other customizations made by the user.

Exemplary embodiments of the present invention differ from prior systems in that every toolbar has its own QC menu so that customization is always easily available and focused on the active toolbar. This QC menu presents a logical group of commands available for display on its corresponding toolbar. For example, buttons having empty checkboxes, i.e., disabled selection indicators, remain displayed in the QC menu even when a control element is removed from the toolbar. Consequently, the user is able to view all available controls for a particular toolbar without facing the fear of "losing" a toolbar control should the user decide to remove it from the toolbar. The QC menu preferably remains open during successive mouse button clicks or keyboard selections to facilitate several chances during one customization exercise. For an alternative embodiment, however, the QC menu could be closed in response to these events during a single customization session.

With continuing reference to FIGS. 1 and 2a–2e, FIG. 3 is a flow diagram illustrating an overview of an exemplary method of operation of the present invention. Those skilled in the art will appreciate that this exemplary method of operation can be carried out by the computer 20 running the application program 36 (FIG. 1), such as the "MICROSOFT OFFICE 9" suite of application programs. The process begins at the START step 300 by powering the computer 20 (FIG. 1) and selecting the exemplary program module 37 (FIG. 1) for supporting the computer-implemented program for customizing a toolbar. In turn, for step 302, a signal is received for accessing a QC menu associated with a toolbar. The signal is received as a result of an action taken by a user, such as using a mouse to click on an entry point of a toolbar. In step 304, the QC menu is displayed in association with the toolbar, as shown in FIG. 2b. The QC menu preferably contains selection indicators, also described as buttons, which represent controls that are available for display on the toolbar. For this exemplary embodiment, checkboxes preferably correspond to these buttons within the QC menu.

A determination is made, in step 306, as to whether there is a desire to add a control to the toolbar. If so, the "Yes"

branch is followed to step 310; otherwise, the "No" branch is followed to step 308, in which case a second determination is made as to whether there is a desire to remove a control from the toolbar. In step 310, a signal is received to add a control to the toolbar. This signal is generated as a result of the user clicking on an empty checkbox for a button in the QC menu. Next, in step 312, a checkmark is placed in the checkbox for the button. In turn, in step 314, the control associated with the button having the checked checkbox is displayed on the toolbar.

If there is no desire to add a control to the toolbar, a determination is made as to whether there is a desire to remove a control from the toolbar, in step 308. If there is a desire to remove a control from the toolbar, the "Yes" branch is followed to step 316; otherwise, the "No" branch is followed to step 330. In step 316, a signal is received to remove a control from the toolbar. This signal is generated as a result of the user clicking on a checked checkbox for a button in the QC menu. When a signal is received to remove a control from the toolbar, in step 318, the checkmark in the checkbox for the button is removed. In turn, in step 320, the control that is associated with the button having an empty checkbox is removed from the toolbar.

Next, a central inquiry is made, in step 325, as to whether there is a desire to make additional changes to the toolbar. If so, the "Yes" branch is followed to step 306, in which case step 306 through step 325 are repeated for additional changes to the toolbar; otherwise, the "No" branch is followed to step 330. In step 330, a signal is received to close the QC menu. Generally, the signal is generated as a result of the user selecting a reset or customize option, hitting escape, clicking away from the QC menu, or using the keyboard to navigate off the QC menu, as previously described in connection with FIGS. 2a–2e. Once the signal is received to close the QC menu, the QC menu is closed in step 335. The customization process terminates at the END step 340.

Figure 3:
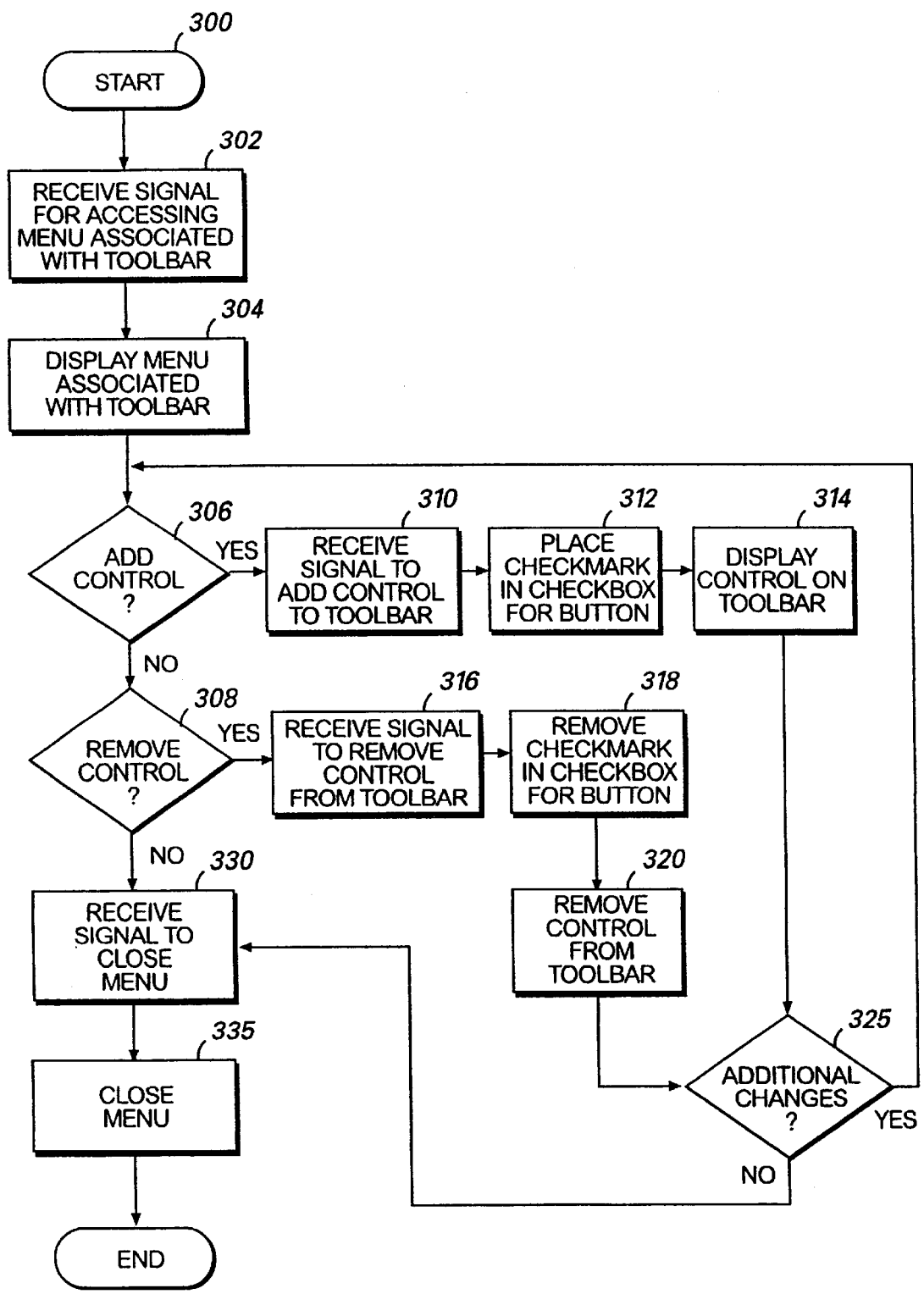
FIG. 3 is a flow diagram illustrating a method of customizing a toolbar in accordance with an exemplary embodiment of the present invention.

With continuing reference to FIGS. 1–3, the tasks performed by a computer 20 (FIG. 1) to implement customizing a toolbar can be described in three segments, namely creating a quick customize menu, checking a checkbox for a button, and unchecking a checkbox for a button. Specifically, the process of creating a QC menu is described in connection with FIGS. 4a–4e. The process of checking a checkbox for a button of the QC menu, thereby adding a control to the toolbar, is described in connection with FIG. 5. Finally, the process of unchecking a checkbox for a button of the QC menu, thereby removing a control from the toolbar, is described in connection with FIG. 6.

FIGS. 4a, 4b, 4c, 4d, and 4e, collectively described as FIG. 4, are flow diagrams illustrating an exemplary process for creating a quick customize menu. The process of creating a QC menu involves using the following toolbars: a toolbar (referred to herein as "current toolbar"), which is the toolbar displayed on the display screen; an original toolbar, which is a toolbar containing a list of default controls and is stored in a database (not shown) as a data source; and an extra toolbar, which is a toolbar containing a list of extra controls that are application specific and is stored in the database as a data source. Generally described, the QC menu is created by merging the current toolbar with the original toolbar and the extra toolbar. The extra toolbar can be used to house new controls created by the user for display on the current toolbar. The exemplary embodiment illustrated in FIG. 4, however, is not limited to storing the controls of this extra toolbar in a database, but instead may store these extra controls in any suitable form known in the art. It will be further appreciated that alternative exemplary embodiments do not necessarily include a QC menu having selection indicators corresponding to extra controls.

Figure 4A:
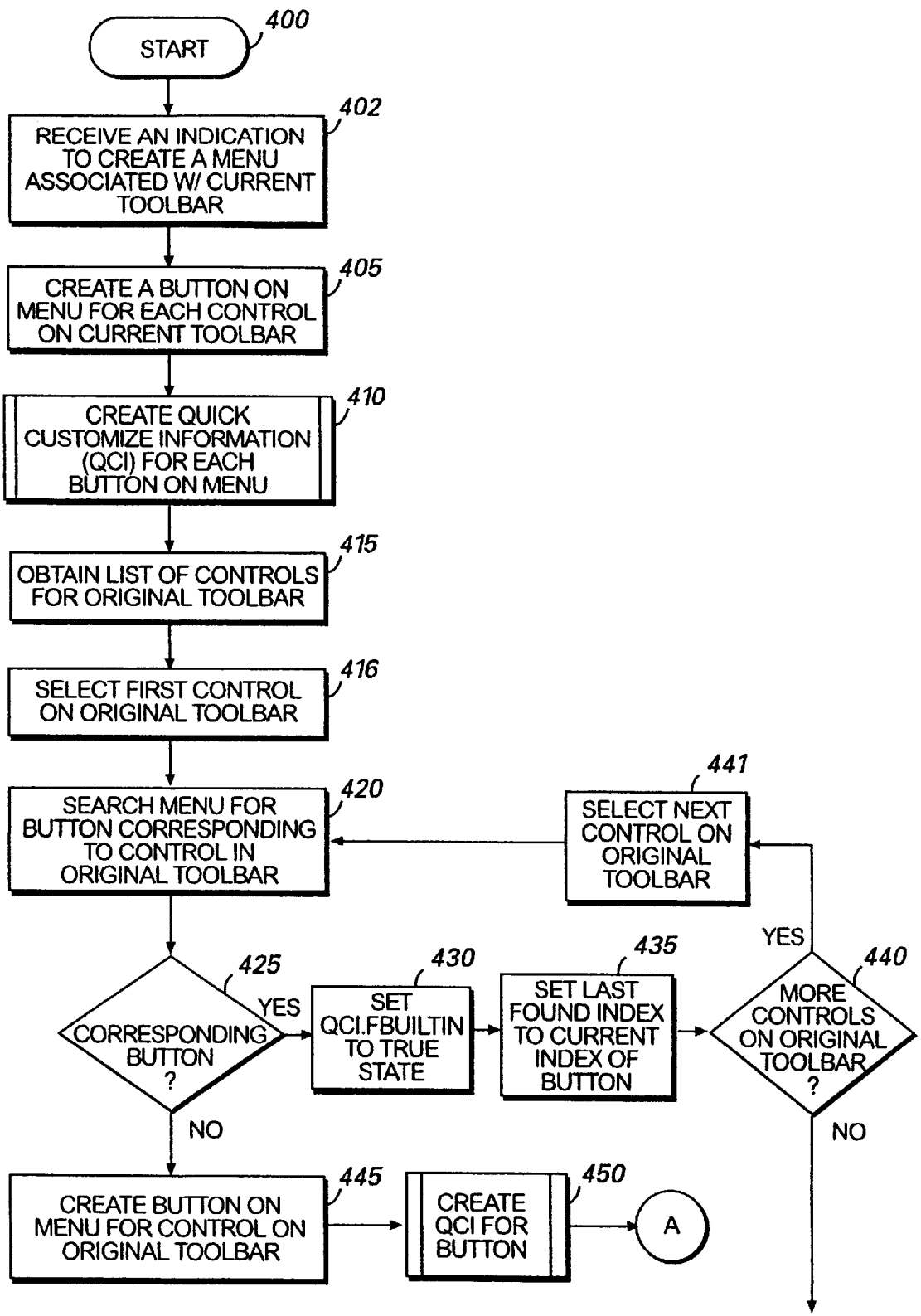
FIGS. 4a, 4b, 4c, 4d, and 4e, collectively described as FIG. 4, are flow diagrams illustrating a process for creating a quick customize menu in accordance with an exemplary embodiment of the present invention.

Referring to FIG. 4a, the exemplary process begins at START step at 400, and in step 402, an indication is received to create a QC menu associated with a current toolbar. Next, in step 405, a button is created in the QC menu for each control on the current toolbar. Quick customize information (QCI) is then created for each button on the QC menu, in step 410. QCI is information, such as whether a control is a default control associated with the original or extra toolbar, whether a control is located on the current toolbar, and whether a control in the menu originated from the current, original, or extra toolbar. The specific QCI that is created for each button associated with a control on the current toolbar is described in connection with FIG. 4c herein.

In step 415, a set or list of controls from an original toolbar is obtained from a database. As previously mentioned, the list of controls are the default controls that are available for display on the current toolbar. Once the list of controls for the original toolbar is obtained, the first control in the list of controls for the original toolbar is selected, in step 416. Next, in step 420, the QC menu is searched for a button corresponding to the selected control from the original toolbar.

A determination is made, in step 425, as to whether one of the buttons in the QC menu corresponds to the selected control in the original toolbar. If so, the "Yes" branch is followed to step 430; otherwise, the "No" branch is followed to step 445. In step 430, a QCI . fBuiltin for the associated button is set to a true state.

The QCI . fBuiltin is a parameter that indicates whether a control is a default control or one of the original controls located in the original or extra toolbars stored in a database. The QCI . fbuiltin exists in two states, namely a true state and a false state. The true state is indicative of a control being one of the original controls—that is, the control is a part of either the original toolbar or the extra toolbar. In the true state, a button drawn on the menu has a selectable checkbox with an associated icon so that a corresponding control can be conveniently added to and removed from the current toolbar. The false state is indicative of a control associated with a button being from some other source. In the false state, a button drawn on the menu has an unselectable checkbox with an associated icon so that a corresponding control cannot be added to or removed from the current toolbar using the checkbox for the button. Specifically, in the false state, the button drawn on the menu is grayed so that it cannot be selected. Moreover, if the QCI . fBuiltin for a control is in a false state, the associated button in the menu is removed from the menu when the control is removed from the current toolbar. However, it will be appreciated by one skilled in the art that the present invention can be implemented such that the a button having a source other than the original toolbar or the extra toolbar can be drawn having a selectable checkbox on the menu, as opposed to graying the button. In this case, the control is a part of the original toolbar based on step 430. Therefore, when the button is drawn in the menu, it has a selectable checkbox.

Next, in step 435, a LastFoundIndex is set to the current index of the associated button on the QC menu. The LastFoundIndex is an index that provides relative positioning so that buttons can be placed in their proper places in the QC menu. In other words, the index is repositioned so that when a button does not correspond to the selected control, the button can be created and entered in a position before or after the index. If the selected control originates from the original toolbar, the associated button is positioned after the index. If the selected control originates from the extra toolbar, the associated button is positioned before the index.

If a determination is made that none of the buttons in the QC menu correspond to the selected control in the original toolbar, a button is created on the QC menu for the selected control in the original toolbar, in step 445. Next, QCI for the button is created in step 450. The specific QCI that is created for the button associated with the selected control in the original toolbar is described in connection with FIG. 4c herein.

Figure 4B:
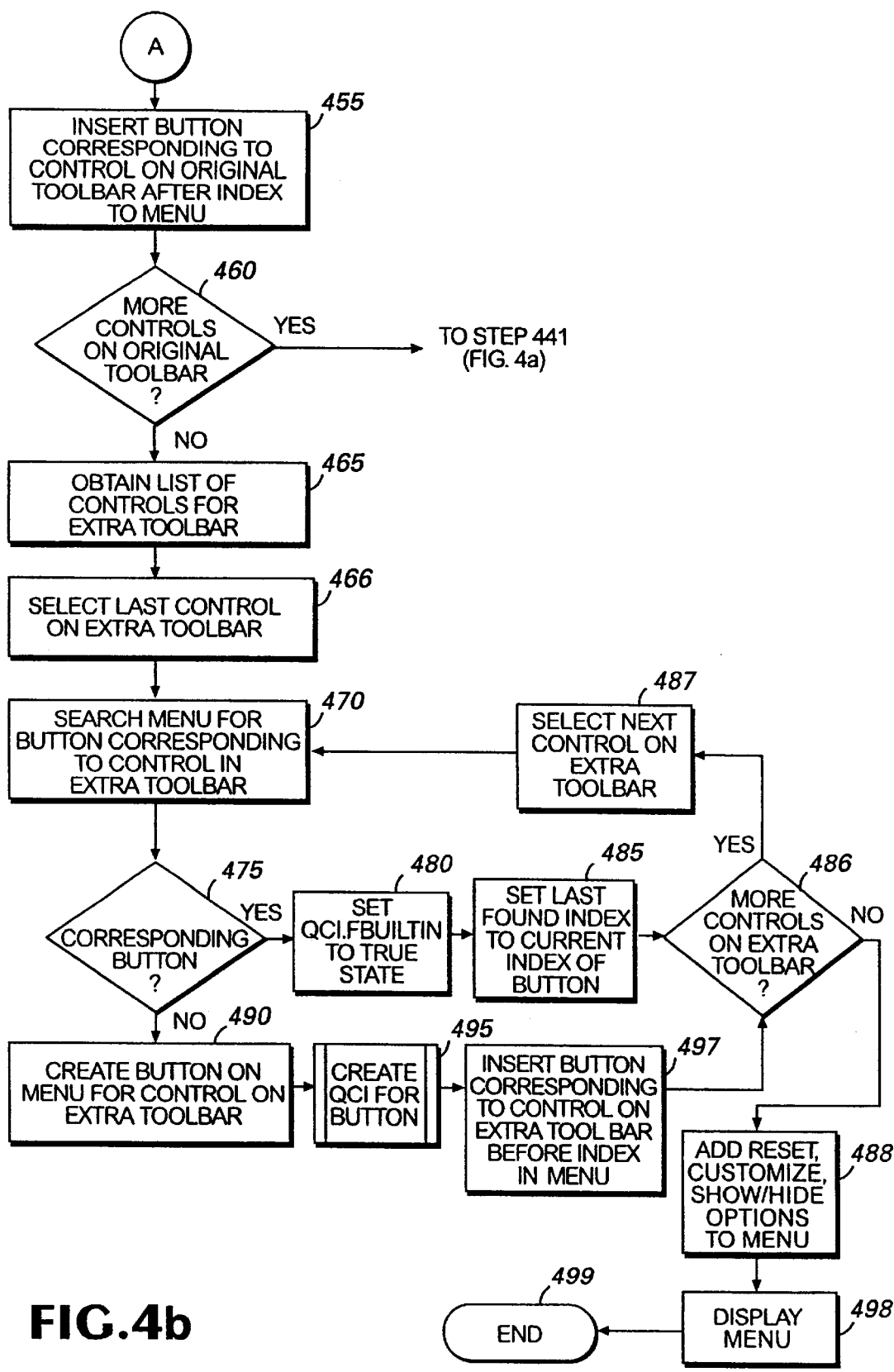

Once the QCI is created for the button, in step 455 (FIG. 4b), the button corresponding to the control in the original toolbar is inserted after the LastFoundIndex in the QC menu. Next, a determination is made as to whether there are more controls in the original toolbar, in step 460. If so, the "Yes" branch is followed to step 441; otherwise, the "No" branch is followed to step 465 (FIG. 4b). In step 441, the next control in the original toolbar is selected. Once the next control in the original toolbar is selected, steps 420 through 455 are repeated for each additional control in the original toolbar.

Referring to FIG. 4b, if there are no more controls in the original toolbar, a set or list of controls for an extra toolbar is obtained from the database, in step 465. As previously mentioned, the list of controls in the extra toolbar is application specific. In step 466, the last control in the list of controls for the extra toolbar is selected. Next, in step 470, the buttons in the QC menu are searched for a button that corresponds to the control in the extra toolbar.

A central inquiry is made, in step 475, as to whether one of the buttons in the QC menu corresponds to the selected control in the extra toolbar. If so, the "Yes" branch is followed to step 480; otherwise, the "No" branch is followed to step 490. In step 480, a QCI . fBuiltin for the associated button is set to a true state because it is a part of the extra toolbar. Next, in step 485, a LastFoundIndex is set to the current index of the associated button on the QC menu.

If a determination is made that none of the buttons in the QC menu corresponds to the selected control in the extra toolbar, a button is created on the QC menu for the control in the extra toolbar in step 490. In connection with the button, QCI for the button is created in step 495. The specific QCI that is created for the button associated with the selected control in the extra toolbar is described in connection with FIG. 4e herein. Once the QCI has been created, the button corresponding to the selected control in the extra toolbar is inserted before the Las tFoundIndex in the QC menu, in step 497.

Next, in step 486, a determination is made as to whether there are more controls in the extra toolbar. If so, the "Yes" branch is followed to step 487; otherwise, the "No" branch is followed to step 488. In step 487, the next control in the extra toolbar is selected, and the process is repeated from steps 470 through 497. Once all of the controls in the extra toolbar have been compared to the buttons in the QC menu, in step 488, the Reset Toolbar option and Customize option are added to the QC menu. Next, the QC menu is displayed, in step 498. The process terminates at the END step 499.

It will be appreciated that the method for drawing the QC menu, controls, toolbar, icons, and checkboxes is known in the art and therefore, is not described herein.

Figure 4C:
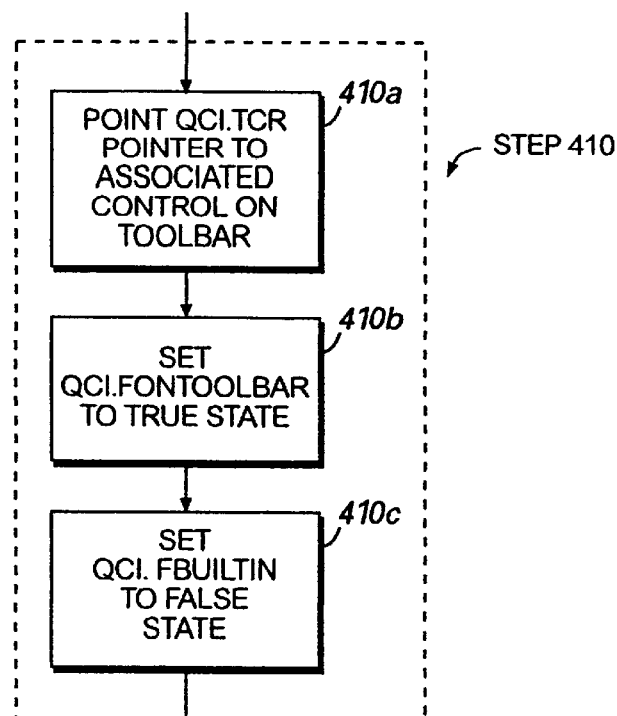

FIG. 4c illustrates the process for creating quick customize information for buttons corresponding to controls from a current toolbar. Specifically, this process describes step 410 (FIG. 4a) in greater detail. Referring to FIG. 4c, in step 410a, a QCI . tcr pointer points to the associated control on the current toolbar. Next, a QCI . fOnToolbar is set to a true state. The QCI . fOnToolbar is a parameter that indicates whether a control is displayed on the toolbar. The QCI . fOnToolbar exists in two states, namely a true state and a false state. The true state for a button indicates that the associated control is displayed on the toolbar and that the checkbox for the button is checked. The false state for a button indicates that the associated control is not displayed on the current toolbar and that the checkbox for the button is not checked. Finally, a QCI . fBuiltin for the button is set to a false state, in step 410c. If the QCI . fBuiltin for the button remains in a false state, the button is displayed in the QC menu when merging is complete, but the checkbox for the button is grayed, and therefore, cannot be checked.

Figure 4D:
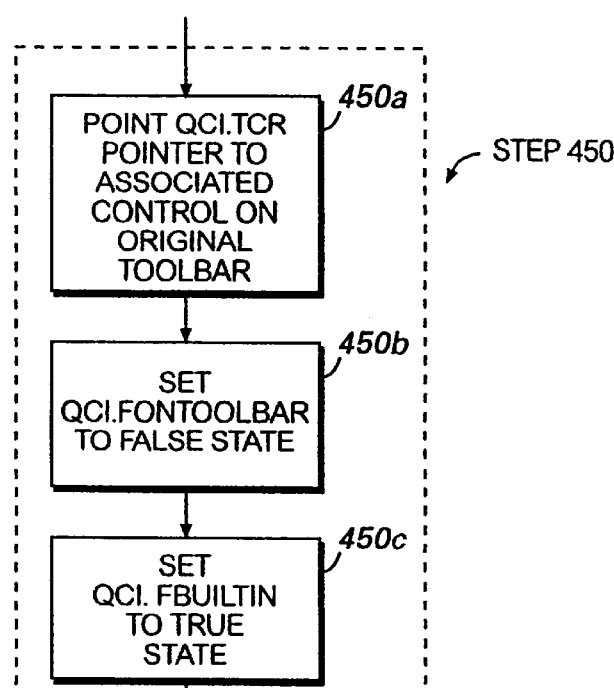

FIG. 4d illustrates the steps for creating quick customize information for a button created based on a control in the original toolbar. Specifically, this process describes step 450 (FIG. 4a) in greater detail. Referring to FIG. 4d, in step 450a, a QCI . tcr pointer points to an associated control on the original toolbar. Next, in step 450b, a QCI . fOnToolbar is set to a false state. Finally, a QCI . fBuiltin is set to a true state, in step 450c.

Figure 4E:
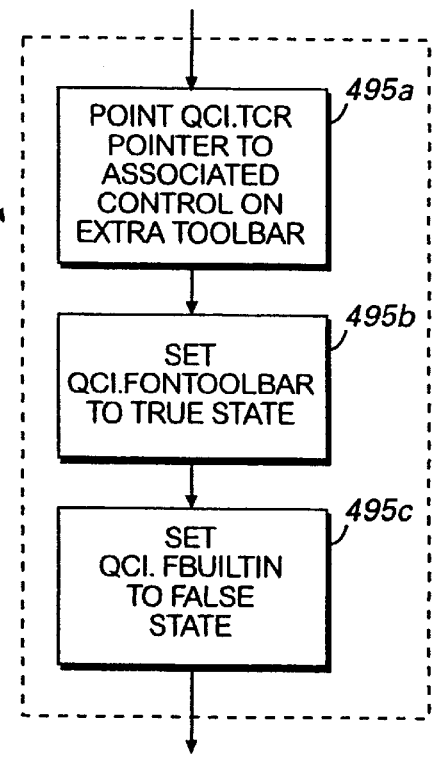

FIG. 4e illustrates a process for creating quick customize information for a button created based on a control in the extra toolbar. Specifically, this process describes step 495 (FIG. 4b) in greater detail. Referring to FIG. 4e, in step 495, a QCI . tcr pointer points to an associated control on the extra toolbar. Next, in step 495b, a QCI . fOnToolbar is set to a false state. Finally, a QCI . fBuiltin is set to a true state, in step 495c.

Based on the foregoing, it will be understood that a QC menu can be created by initiating a menu open event and, in turn, merging a current toolbar, an original toolbar, and extra toolbar to create a list of buttons or selection indicators directly corresponding to the controls for each toolbar. For the exemplary embodiment illustrated in FIG. 4, each button in the QC menu has either a checked or empty checkbox based on whether the button is displayed in the current toolbar. Moreover, each button is presented in an order corresponding to the order presented on the current toolbar. Although this exemplary embodiment presents buttons in the menu and controls on the toolbar in a relative sequential order, it will be appreciated that the present invention is not limited to this type of presentation. An alternative embodiment can instead present buttons and toolbar controls in any order so long as the buttons are displayed in the QC menu as a result of merging the toolbars "on the fly." Yet another embodiment can include a "static" QC menu, in which the default selection indicators corresponding to controls of a toolbar are implemented during development of the underlying program module, and the state of these selection indicators are maintained in memory to support the construction of the toolbar.

Once the QC menu is created for the exemplary embodiment illustrated in FIG. 4, the process of customizing the current toolbar can be readily performed by a user of the program module. For example, checking and unchecking checkboxes for buttons on the QC menu adds or removes the associated controls to or from the current toolbar. A button having a QCI . fOnToolbar set to true displays a checkmark in the checkbox for the button, thereby indicating that the corresponding control element should be displayed within the toolbar.

In an alternative embodiment, the process of creating a QC menu involves using only the current toolbar, which is displayed on the display screen, and the original toolbar, which contains a list of default controls and is stored in a database (not shown) as a data source. In this alternative embodiment, there is no extra toolbar. Hence, the QC menu is created by simply merging the current toolbar with the original toolbar in a manner similar to the process previously described.

Figure 5:
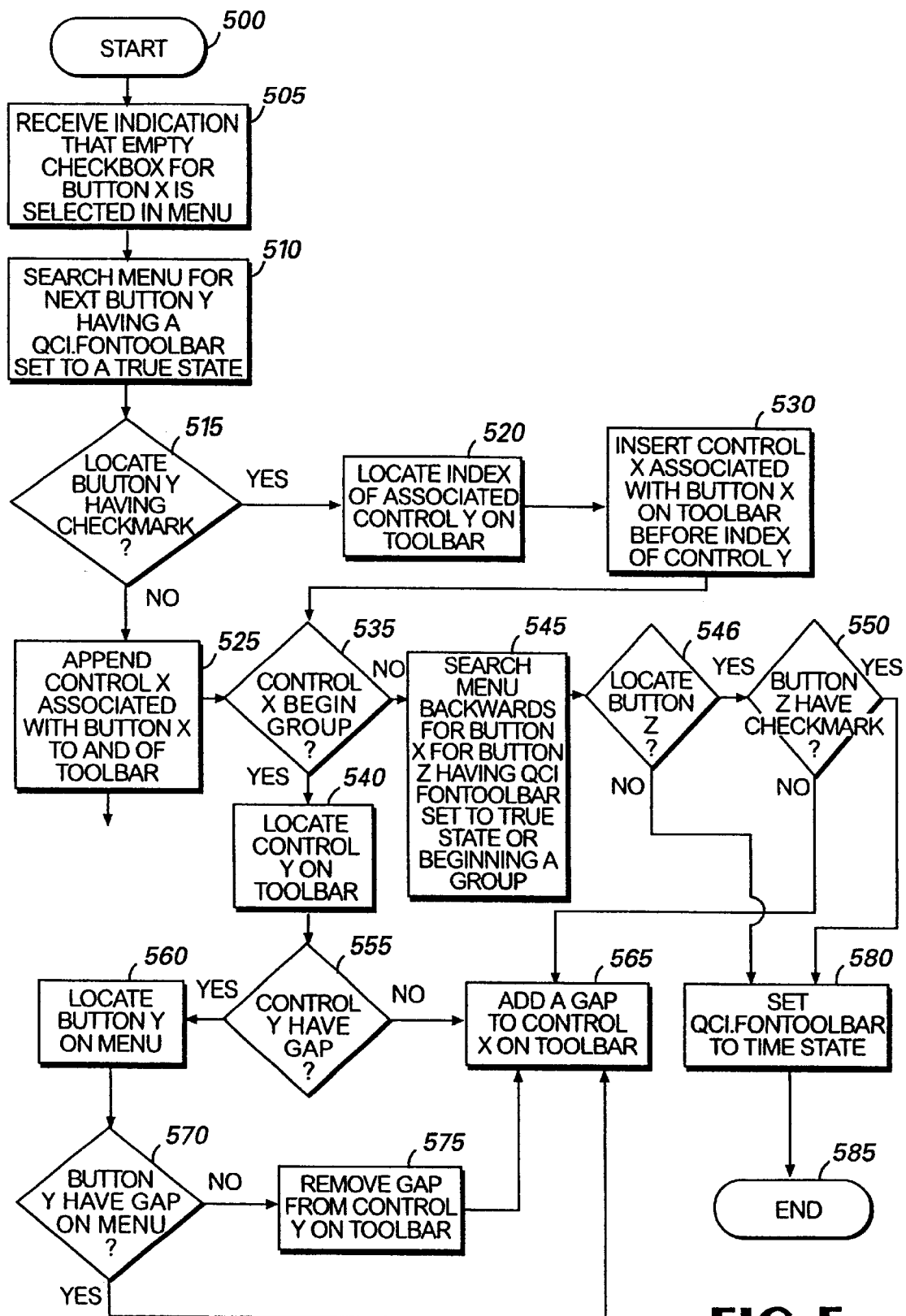
FIG. 5 is a flow diagram illustrating a process for checking a checkbox of a quick customize menu to control the presentation of a corresponding control element on a tool bar in accordance with an exemplary embodiment of the present invention.

Referring to FIG. 5, an exemplary method for checking a checkbox associated with a button X in a QC menu is illustrated in accordance with an exemplary embodiment of the present invention. By checking a checkbox for a button X in the QC menu, which is associated with a toolbar, a control X corresponding to the button X is added to the toolbar. The method begins at the START step 500, and in step 505, an indication is received that an empty checkbox is selected for the button X in the QC menu. Once the indication is received, the correct index must be found for the control X corresponding to the button X so that the control X can be placed in the correct position on the toolbar.

To determine the correct index for the control X, in step 510, the QC menu is searched starting with the next button in the QC menu to find a button Y having a QCI . fOnToolbar set to a true state. The true state of a QCI . fOnToolbar for a button is indicative of the button having its corresponding control displayed on the toolbar and having its checkbox checked. A determination is made, in step 515, as to whether a button Y having its checkbox checked has been located. If so, the "Yes" branch is followed to step 520; otherwise, the "No" branch is followed to step 525, in which case the control X corresponding to the button X is placed at the end of the toolbar. In step 520, the index of a control Y, which corresponds to the button Y, is located on the toolbar. Next, in step 530, the control X corresponding to the button X in the QC menu is inserted on the toolbar before the index of the control Y.

A central inquiry is then made, in step 535, as to whether the control X begins a group of controls. Controls typically are grouped according to some related function and usually are demarcated by a separator or gap to distinguish groups. A separator or gap in a toolbar preferably is identified by a vertical line. For example, referring back to FIG. 2*a,* separators exist between buttons 210 and 212, buttons 216 and 218, buttons 218 and 220, and buttons 220 and 222 on the toolbar 202.

One example of a group of controls is the group of Bold, Italic, and Underline. In this example, the Bold control begins the group and is marked by a bit to indicate that the Bold control is the first control of the group. When the Bold control is displayed in the toolbar, it is accompanied by a separator based on the bit. If the Bold control is deleted or removed from the toolbar, the separator is moved to the next control in the group, namely the Italic control. When the Bold control is added back to the toolbar, the separator is removed from the Italic control so that the Bold and Italic controls are not displayed as separate groups.

If the control X begins a group, the "Yes" branch is followed to step 540; otherwise, the "No" branch is followed to step 545. In step 540, the control Y is located on the toolbar, and determination is made, in step 555, as to whether the control Y has a gap on the toolbar. If a determination is made that the control Y has a gap on the toolbar, the "Yes" branch is followed to step 560; otherwise, the "No" branch is followed to step 565. In step 560, the button Y corresponding to the control Y is located, and another determination is made, in step 570, as to whether the button Y has a gap in the QC menu. If so, the "Yes" branch is followed to step 565, in which case a gap is added to the control X in the toolbar; otherwise, the "No" branch is followed to step 575, in which case the gap for the control Y is removed in the toolbar, and a gap then is added to the control X in the toolbar, in step 565. Next, in step 580, the QCI . fOnToolbar for button X is set to a true state, thereby placing a checkmark in the checkbox for button X. The process terminates at the END step 585.

If a determination is made that the control X does not begin a group, the QC menu is searched backwards from the button X, which corresponds to the control X, to find a button Z having a QCI . fOnToolbar set to a true state or beginning a group, in step 545. Next, a central inquiry is made, in step 546, as to whether the button Z has been located. If so, the "Yes" branch is followed to step 550, where a determination is made as to whether the button Z has a checkmark; otherwise, the "No" branch is followed to step 580. If the determination is made that the button Z has a checkmark or if button Z is not located, the search ends, and in step 580, the QCI . fOnToolbar for button X is set to a true state, thereby placing a checkmark in the checkbox for button X in the QC menu. If a button Z having a checkmark in not located in the QC menu, a gap is added to the control X on the toolbar, thereby indicating that the control X is the first control on the toolbar. Next, in step 580, the QCI . fOnToolbar for button X is set to a true state, thereby placing a checkmark in the checkbox for button X in the QC menu. The process terminates at the END step 585.

Figure 6:
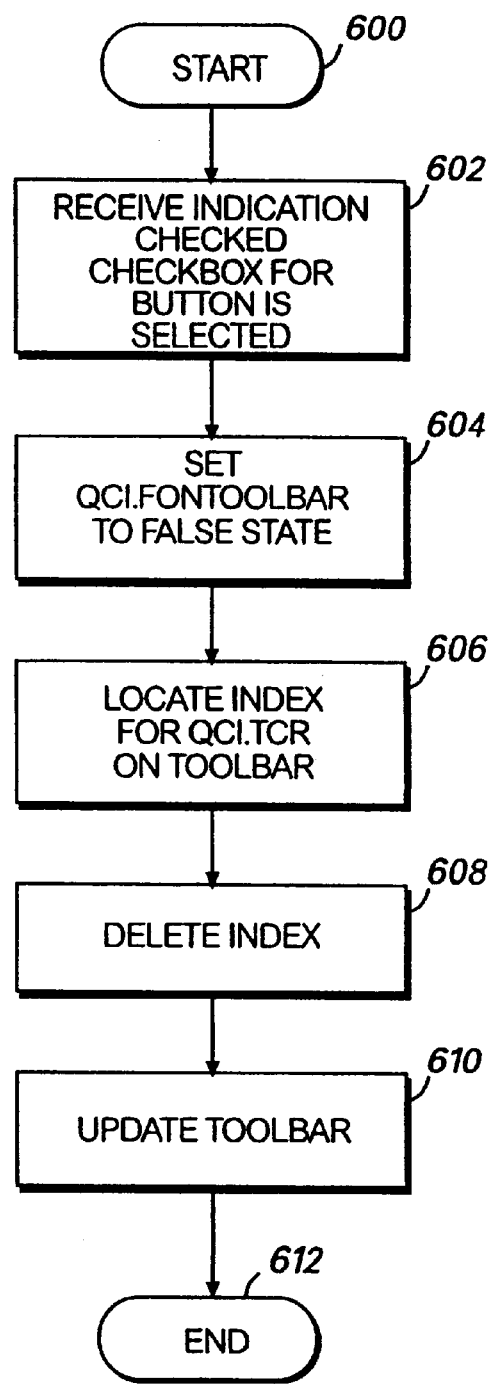
FIG. 6 is a flow diagram illustrating a process for unchecking a checkbox of a quick customize menu to control the presentation of a corresponding control element on a tool bar in accordance with an exemplary embodiment of the present invention.

With continuing reference to FIGS. 1–5, FIG. 6 is a flow diagram illustrating an exemplary process for unchecking a button on a quick customize menu in accordance with an exemplary embodiment of the present invention. Unchecking a checkbox for a button removes the corresponding control from the toolbar. Referring to FIG. 6, the exemplary method starts with the START step 600, and in step 602, an indication is received that a checked checkbox for a button is selected. Next, in step 604, the QCI . fOnToolbar is set to a false state. In step 606, the index of the QCI . tcr is located on the toolbar. The QCI . tcr is a pointer that points to the control on the toolbar. Once the index of the QCI . tcr is located on the toolbar, the index is deleted, in step 608. As a result, in step 610, the toolbar is updated to reflect removal of the control, which is located at the index, from the toolbar, where the control is associated with the now empty checkbox for the button on the QC menu. The process ends at the END step 612.

In another alternative embodiment, when a checkbox for a button is unchecked, the corresponding control on the toolbar is simply hidden from view, instead of removed from the toolbar, as described above with respect to FIG. 6. Consequently, the process of merging toolbars to create the QC menu, as described in connection with FIGS. 4*a*–4*e,* is unnecessary.

In summary, it will be understood that the present invention provides supports customization of a toolbar by use of a quick customize menu. The present invention provides a "discoverable" customization mechanism that allows a user to select which control elements should be displayed on a toolbar by accessing a GUI element presenting information and controls related to the presentation of these control elements. For example, an exemplary embodiment of the present invention provides a user intuitive mechanism for accessing a drop-down menu, namely the quick customize menu, for presenting selection indicators corresponding to available control elements of a toolbar. In response to accessing the quick customize menu and selecting a particular selection indicator, the presentation of a corresponding control element can be easily controlled by the user. For example, by enabling a selection indicator, the corresponding control element is presented for operation on the toolbar, whereas disabling this selection indicator results in no presentation of the corresponding control element on the toolbar.

The invention may conveniently be implemented in one or more program modules that are based upon an implementation of the features illustrated in FIGS. 2–6. No particular programming language has been described for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

Although the present invention was described in the context of a word processing program module, which displays a standard toolbar, those skilled in the art will appreciate that the present invention is applicable not only to word processing program module, but also to other types of GUI features and program modules. Similarly, the present invention may be applied regardless of whether the GUI elements and controls are implemented in program modules associated with an operating system or application program.

Although the present invention was described having a toolbar horizontally oriented at the top of and physically attached to an application window, those skilled in the art will appreciate that the present invention is not limited to this arrangement, but may include a toolbar that can be positioned anywhere in the application window. Furthermore, the toolbar can be vertically oriented, floating, or any combination thereof.

Alternative embodiments will become apparent to those skilled in the art to which the present invention pertains without departing from its spirit and scope. Accordingly, the scope of the present invention is defined by the appended claims rather than the foregoing description.

What is claimed is:

1. A system for creating a quick customize (QC) menu associated with a current toolbar comprising:
   a system memory for storing an original toolbar comprising a plurality of default controls in a first sequence;
   a display device for displaying the current toolbar comprising a plurality of current controls in a second sequence; and
   a processor functionally coupled to the system memory and the display device, operable for executing computer-executable instructions for:
      creating the QC menu including a plurality of selection indicators presented in order of the second sequence, each selection indicator corresponding to one of the current controls and indicating that the corresponding current control is located on the current toolbar,
      in the QC menu, setting an index before a first selection indicator,
      selecting a first default control from the plurality of default controls,
      determining whether the QC menu includes a default control matching selection indicator corresponding to one of the current controls and also to the first default control,
      if the QC menu includes the default control matching selection indicator, resetting the index at the default control matching selection indicator, and
      if the QC menu does not include the default control matching selection indicator, placing on the QC menu a default control selection indicator corresponding to the first default control, the default control selection indicator being placed on the QC menu after the index so as to maintain the relative orders of the first sequence and the second sequence.

2. The system of claim 1, wherein the processor is further operable for executing computer-executable instructions for adding to the QC menu a reset option for resetting the toolbar to a default state and a customize option for providing additional customization features.

3. The system of claim 1, wherein each selection indicator corresponding to one of the current controls comprises an icon having a corresponding checkbox.

4. The system of claim 3, wherein each selection indicator indicating that the corresponding current control is located on the current toolbar comprises a checkmark placed in each corresponding checkbox.

5. The system of claim 1, wherein selecting the first default control from the plurality of default controls comprises selecting one of the plurality of default controls located in a first position in the original toolbar.

6. The system of claim 1, wherein the system memory further stores an extra toolbar comprising a plurality of extra controls in a third sequence; and
   wherein the processor is further operable to execute computer-executable instructions for:
      in the QC menu, resetting the index after a last selection indicator,
      selecting a first extra control from the plurality of extra controls,
      determining whether the QC menu includes an extra control matching selection indicator corresponding to one of the current controls and also to the first extra control,
      if the QC menu includes the extra control matching selection indicator, resetting the index at the extra control matching selection indicator, and
      if the QC menu does not include the extra control matching selection indicator, placing on the QC menu an extra control selection indicator corresponding to the first extra control, the extra control selection indicator being placed on the QC menu before the index so as to maintain the relative orders of the first sequence and the third sequence.

7. The system of claim 6, wherein selecting the first extra control from the plurality of extra controls comprises selecting one of the plurality of extra controls located in a last position in the extra toolbar.

8. The system of claim 1, wherein the processor is further operable to execute computer-executable instructions for displaying the QC menu on the display device as a drop-down menu; and
   wherein each selection indicator included in the QC menu is represented by a checkbox control item operating in a first state when a checkmark is placed in the checkbox control item and operating in a second state when the checkmark is removed from the checkbox control item.

9. The system of claim 8, wherein the processor is further operable to execute computer-executable instructions for:
   in response to receiving a selection signal for controlling a particular selection indicator, placing the particular selection indicator in a selected one of the first state or the second state;

in the event that the particular selection indicator is placed in the first state, enabling presentation on the current toolbar of an additional current control corresponding to the particular selection indicator; and in the event that the particular selection indicator is placed in the second state, disabling presentation on the current toolbar of one of the current controls corresponding to the particular selection indicator.

10. The system of claim 1, wherein the processor is further operable to execute computer-executable instructions for displaying the QC menu as a dialog; and wherein each selection indicator included in the QC menu is represented by a radio button control item operating in a first state when the radio button control item is enabled and operating in a second state when the radio button control item is disabled.

11. The system of claim 10, wherein the processor is further operable to execute computer-executable instructions for:

in response to receiving a selection signal for controlling a particular selection indicator, placing the particular selection indicator in a selected one of the first state or the second state;

in the event that the particular selection indicator is placed in the first state, enabling presentation on the current toolbar of an additional current control corresponding to the particular selection indicator; and in the event that the particular selection indicator is placed in the second state, disabling presentation on the current toolbar of one of the current controls corresponding to the particular selection indicator.

12. The system of claim 1, wherein the processor is further operable to execute computer-executable instructions for displaying the QC menu as a toolbar; and wherein each selection indicator included in the QC menu is represented by a control item operating in a first state when enabled and operating in a second state when the control item is disabled.

13. The system of claim 12, wherein the processor is further operable to execute computer-executable instructions for:

in response to receiving a selection signal for controlling a particular selection indicator, placing the particular selection indicator in a selected one of the first state or the second state;

in the event that the particular selection indicator is placed in the first state, enabling presentation on the current toolbar of an additional current control corresponding to the particular selection indicator; and in the event that the particular selection indicator is placed in the second state, disabling presentation on the current toolbar of one of the current controls corresponding to the particular selection indicator.

14. A system for inserting a selected control on the toolbar comprising:

a system memory for storing a toolbar comprising a plurality of controls and an associated quick customize (QC) menu comprising a plurality of selection indicators, each of the selection indicators of the QC menu corresponding to one of the controls in the toolbar;

an input device for generating an input signal;

a display device for displaying the toolbar and the associated QC menu; and a processor functionally coupled to the system memory, the input device and the display device, operable for executing computer-executable instructions for:

receiving the input signal indicating that a selection indicator corresponding to the selected control is selected in the QC menu;

in the QC menu, locating a next selection indicator indicating that a corresponding next control is displayed on the toolbar;

in the toolbar, determining an index associated with the next control;

in the toolbar, inserting the selected control before the index;

in response to inserting the selected control in the toolbar, providing an indication in the QC menu that the selected control is displayed on the toolbar; and reconciling any separators for separating groups of controls on the toolbar comprising:

determining that the selected control begins a group of controls, determining that the next control on the toolbar has a first associated separator, determining that the next selection indicator in the QC menu has a second associated separator, and in response to determining that the next selection indicator has the second associated separator, adding a third separator to the selected control on the toolbar.

15. The system of claim 14, wherein reconciling any of the separators comprises:

determining that the selected control does not begin a group of controls;

in the QC menu, determining that a previous selection indicator indicates that a corresponding previous control is not displayed on the toolbar; and in response to determining that the previous control is not displayed on the toolbar, adding the third separator to the selected control on the toolbar.

16. The system of claim 14, wherein reconciling any of the separators comprises:

determining that the selected control begins a group of controls;

determining that the next control on the toolbar does not have the first associated separator; and in response to determining that the next control on the toolbar does not have the first associated separator, adding the third separator to the selected control on the toolbar.

17. The system of claim 14, wherein reconciling any of the separators comprises:

determining that the selected control begins a group of controls;

determining that the next control on the toolbar has the first associated separator;

determining that the next selection indicator in the QC menu does not have the second associated separator;

in response to determining that the next selection indicator does not have the second associated separator, removing the first associated separator from the next control on the toolbar; and adding the third separator to the selected control on the toolbar.

* * * * *